(12) United States Patent
Andrade et al.

(10) Patent No.: US 8,321,443 B2
(45) Date of Patent: Nov. 27, 2012

(54) PROXYING OPEN DATABASE CONNECTIVITY (ODBC) CALLS

(75) Inventors: Henrique Andrade, Croton-on-Hudson, NY (US); Bugra Gedik, White Plains, NY (US); Martin J. Hirzel, White Plains, NY (US); Robert J. Soule, Brooklyn, NY (US); Huayong Wang, Bejing (CN); Kun-Lung Wu, Yorktown Heights, NY (US); Qiong Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 12/876,348

(22) Filed: Sep. 7, 2010

(65) Prior Publication Data

US 2012/0059839 A1 Mar. 8, 2012

(51) Int. Cl.
*G06F 17/30* (2006.01)
(52) U.S. Cl. ........ 707/760; 707/707; 707/723; 709/203; 719/328
(58) Field of Classification Search .................. 707/760, 707/797, 705, 707, 723, 769, 770; 705/10; 709/203; 719/328
See application file for complete search history.

(56) References Cited

U.S. PATENT DOCUMENTS

| | | | | |
|---|---|---|---|---|
| 5,987,454 | A * | 11/1999 | Hobbs | 707/723 |
| 6,457,003 | B1 * | 9/2002 | Gajda et al. | 1/1 |
| 6,470,350 | B1 * | 10/2002 | Behr et al. | 1/1 |
| 6,523,022 | B1 * | 2/2003 | Hobbs | 707/769 |
| 6,671,689 | B2 * | 12/2003 | Papierniak | 707/769 |
| 6,807,539 | B2 * | 10/2004 | Miller et al. | 1/1 |
| 7,099,871 | B2 | 8/2006 | Faybishenko et al. | |
| 7,162,467 | B2 * | 1/2007 | Eshleman et al. | 707/769 |
| 7,624,098 | B2 * | 11/2009 | Dettinger et al. | 707/705 |
| 7,831,616 | B2 * | 11/2010 | Miller et al. | 707/781 |
| 2002/0116457 | A1 * | 8/2002 | Eshleman et al. | 709/203 |
| 2003/0088544 | A1 | 5/2003 | Kan et al. | |
| 2003/0126114 | A1 * | 7/2003 | Tedesco | 707/3 |
| 2003/0126120 | A1 | 7/2003 | Faybishenko et al. | |
| 2006/0004709 | A1 * | 1/2006 | Borthakur et al. | 707/3 |
| 2008/0016147 | A1 | 1/2008 | Morimoto | |
| 2009/0132494 | A1 * | 5/2009 | Gutlapalli et al. | 707/769 |
| 2009/0234813 | A1 * | 9/2009 | Gutlapalli et al. | 707/769 |
| 2009/0327224 | A1 | 12/2009 | White et al. | |
| 2010/0036712 | A1 * | 2/2010 | Abrahamsohn | 705/10 |
| 2012/0054173 | A1 | 3/2012 | Andrade et al. | |

OTHER PUBLICATIONS

Barja, Maria Luisa, et al., "Informia: a Mediator for Integrated Access to Heterogeneous Information Sources", CIKM 98, Bethesda, MD, © 1998, pp. 234-241.*

(Continued)

*Primary Examiner* — Shahid Alam
(74) *Attorney, Agent, or Firm* — William Stock, Esq.; Blanche E. Schiller, Esq.; Heslin Rothenberg Farley & Mesiti P.C.

(57) ABSTRACT

An Open Database Connectivity (ODBC) proxy infrastructure to transparently route incoming queries to one or more selected query engines. The ODBC proxy receives a query from an application, and determines based on the characteristics of the query and the capabilities of the query engines which one or more query engines are to perform the query. The proxy then routes the query to the one or more query engines, which perform the query. The results are then returned to the proxy, which provides the results to the application.

21 Claims, 10 Drawing Sheets

OTHER PUBLICATIONS

Mattos, Nelson Mendonça, et al., "Integrating Information for on Demand Computing", Proc. of the 29th VLDB Conf., Berlin, Germany, © 2003, pp. 8-14.*

Roth, M. A., et al., "Information integration: A new generation of information technology", IBM Systems Journal, vol. 41, No. 4, © 2002, pp. 563-577.*

The American Heritage College Dictionary, 4th Edition, Houghton Mifflin Co., Boston, MA, © 2002, pp. 650 and 663.*

Zhang, Yiyang, et al., "An associative classification-based recommendation system for personalization in B2C e-commerce applications", Expert Systems with Applications, vol. 33, Issue 2, Aug. 2007, pp. 357-367.*

Arasu, Arvind et al., "The CQL Continuous Query Language: Semantic Foundations and Query Execution," VLDB Journal, 2003, 32 pages.

* cited by examiner

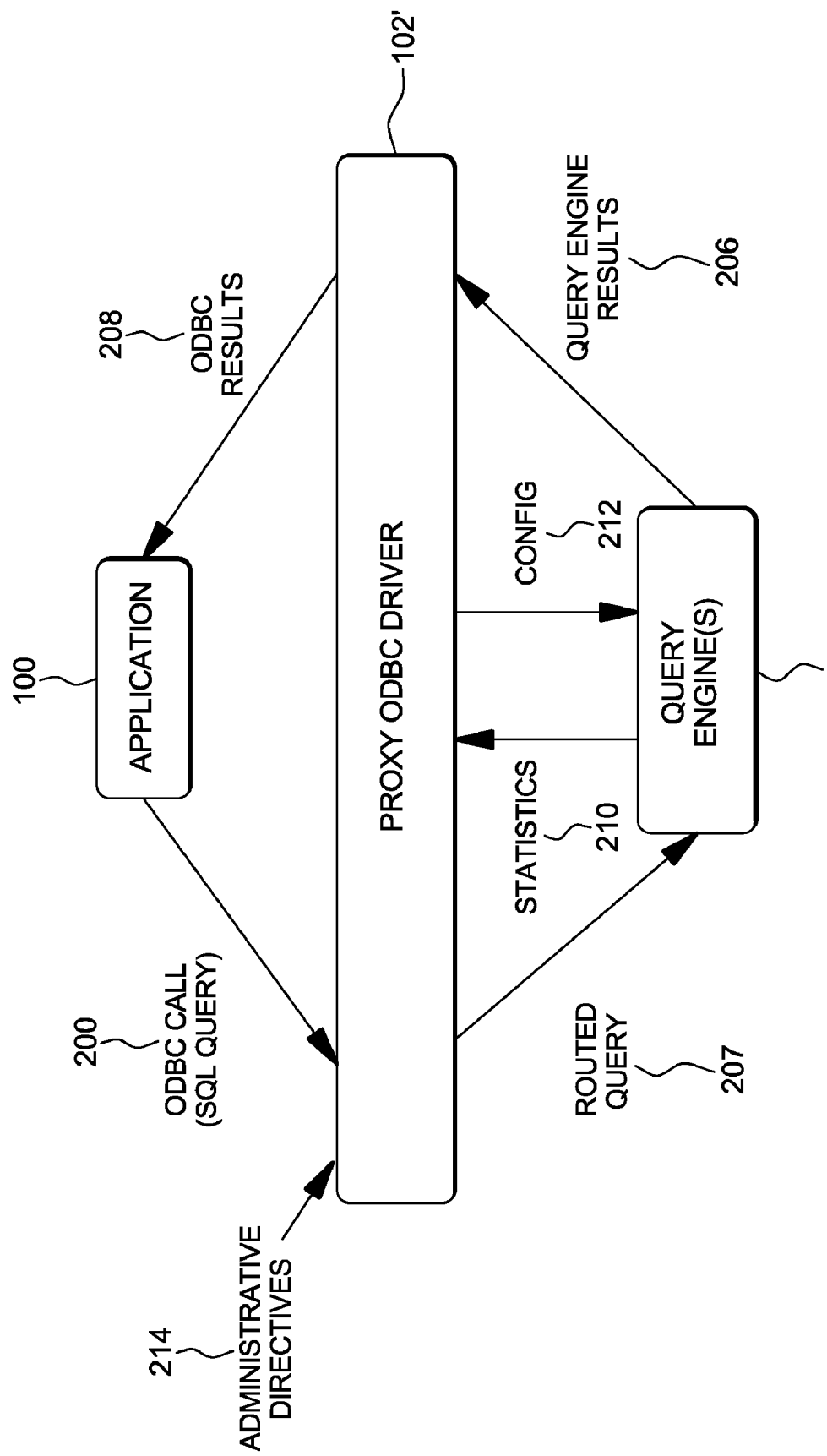

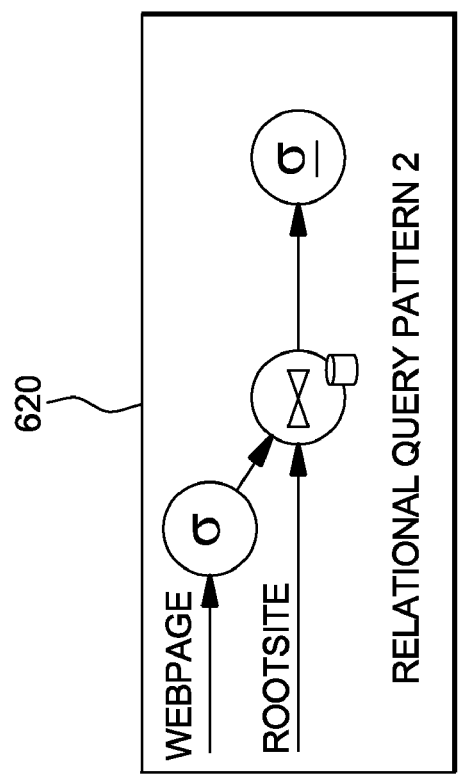
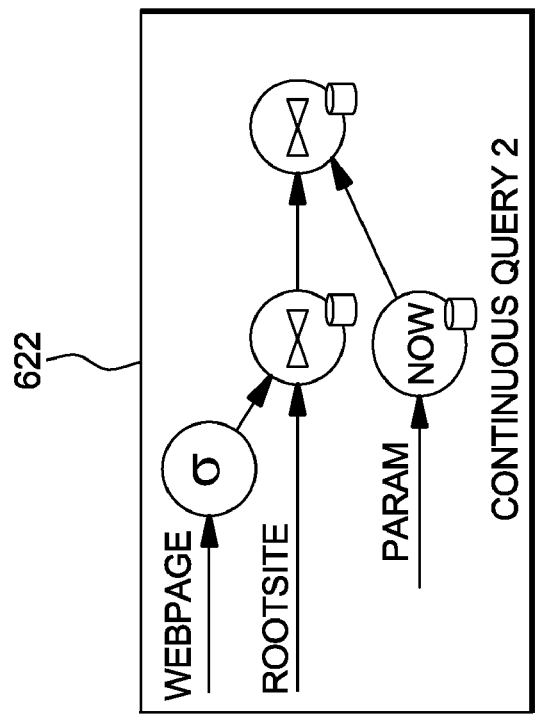
FIG. 6B

PROXYING OPEN DATABASE CONNECTIVITY (ODBC) CALLS

This invention was made with Government support under Contract No.: H98230-07-C-0383 awarded by Intelligence Agencys. The Government has certain rights in this invention.

BACKGROUND

This invention relates, in general, to database calls, and in particular, to distributing queries of database calls received at a bridge in a common interface language to one or more query engines of a plurality of query engines.

One common interface language is the Open Database Connectivity (ODBC) framework, which provides Application Programming Interfaces (APIs) for using database servers, without tying an application to a particular database server from a specific vendor. The designers of the ODBC interface aimed to make it independent of programming languages, database systems, and operating systems. In other words, an application can, for the most part, be written without an a priori knowledge of which specific database server is going to be used. Furthermore, as the application evolves, the original database server can be replaced by another one without requiring that the application source code be modified in any way. The fundamental idea behind this transparency lies in writing the application such that all database interactions are made via ODBC calls, by making use of service APIs whose implementation is customized by the different database vendors providing ODBC-compliant relational database management systems.

An application that makes use of ODBC interfaces is usually statically or dynamically linked against an ODBC driver, which in turn converts an application query into a representation understood by the database server. The driver also converts the query results obtained from the database server into one or more result sets. These result sets are then processed via other ODBC interfaces and, finally, the actual query results are returned to the application.

As indicated, when an ODBC driver receives queries, it sends them to a database server. As the data volume increases, application slowdown might occur, as database operations become a bottleneck. In such cases, the database server might become overloaded and the application might cease to satisfy customer requirements on response time, latency, data volume, among others, potentially violating quality of service agreements.

BRIEF SUMMARY

The shortcomings of the prior art are overcome and additional advantages are provided through the provision of a method of proxying one or more Open Database Connectivity (ODBC) calls from an application to one or more query engines of a plurality of query engines. The method includes, for instance, receiving from the application at an ODBC proxy executing on a processor an ODBC call, the ODBC call including a query; determining by the ODBC proxy which one or more query engines of the plurality of query engines should be used to satisfy the query, the determining being based on one or more characteristics of the query and on one or more capabilities of the plurality of query engines to compute query results; routing the query to one or more selected query engines based on the determining; receiving by the ODBC proxy results from the one or more selected query engines; and returning the results received from the one or more selected query engines to the application.

Systems and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts one example of a general organization and flows responsive to using an ODBC proxy driver, in accordance with an aspect of the present invention;

FIGS. 6A-6C depicts examples of results of a prepare step used to transform a query from an SQL query into a query engine-specific query, in accordance with an aspect of the present invention.

DETAILED DESCRIPTION

Figure 1A:
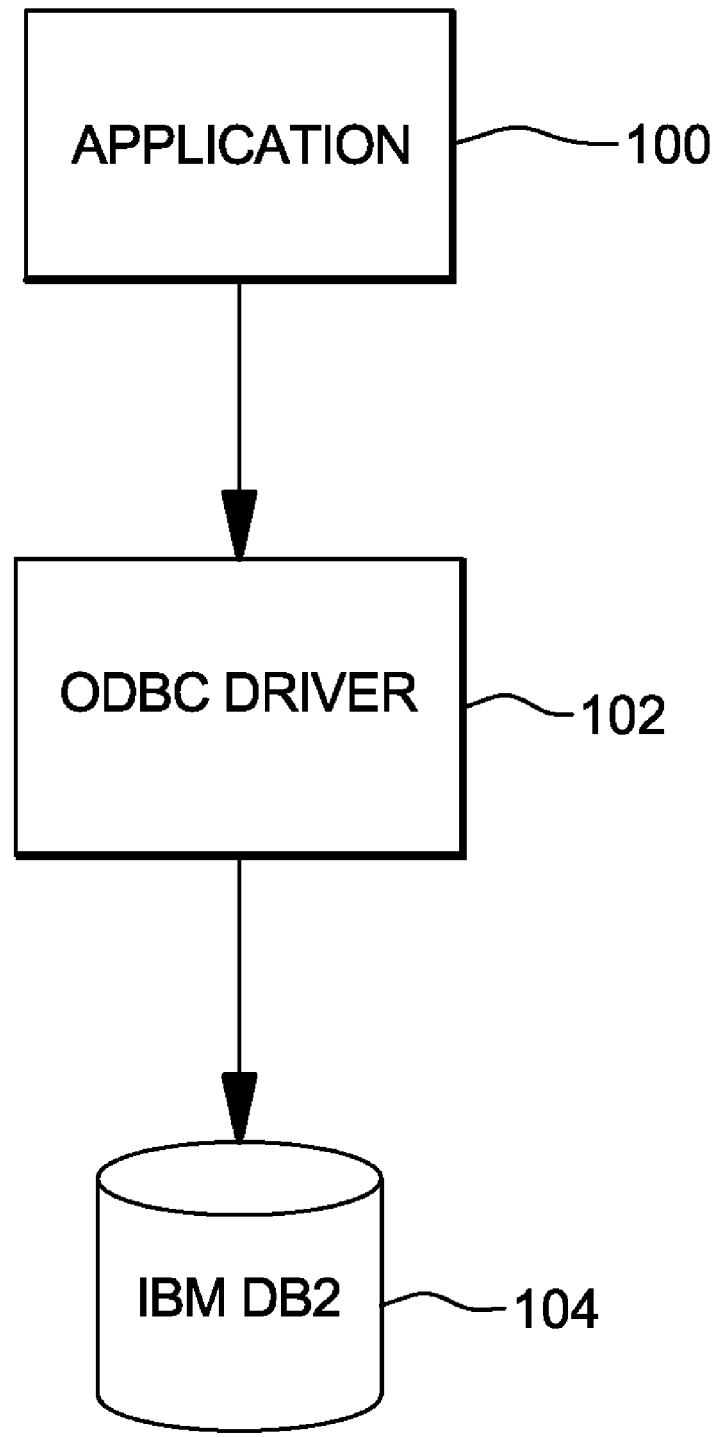
FIG. 1A depicts one example of a typical use of an ODBC driver.

In one typical example, applications use standard software interfaces for accessing database systems. For instance, as shown in FIG. 1A, an application 100 accesses a database system 104 via interfaces of a driver 102. As one example, the database system is DB2® offered by International Business Machines Corporation (IBM®) and the driver is an Open Database Connectivity (ODBC) driver. The application issues ODBC calls that include queries to select data from the database. The calls are received at the driver and the driver forwards the queries to the database server. The server performs the queries and returns the results to the driver. The driver then forwards the results to the application. (DB2® and IBM® are registered trademarks of International Business Machines Corporation, Armonk, N.Y. Other names used herein may be registered trademarks, trademarks or product names of International Business Machines Corporation or other companies.)

In the above example, the ODBC driver is statically coupled to the database server, and all queries received at the driver are performed by that database server. There are times, however, when access to that database is bottlenecked or there may be another database server or specialized query engine that would be better suited to execute the query. Thus, in accordance with an aspect of the present invention, a query routing mechanism is provided that transparently and dynamically routes a received query to one or more selected query engines based on, for instance, the type of query and/or characteristics of the available query engines.

This transparent query routing mechanism includes, for instance, an ODBC proxy driver (a.k.a., proxy), which functions as a drop-in replacement for the original ODBC driver employed by an application. The proxy intercepts ODBC calls made by applications and routes the queries of those calls to one or more backend query engines, dynamically, upon inspection of, for instance, the specific queries and their predicates. The query engines used to compute the query results might include, for example, the original database server employed by the application (e.g., DB2®); other database servers, such as other typical relational database servers (e.g., MySQL, etc.); custom-built applications with query computing capabilities; map/reduce computational engines (e.g., Apache Foundation's Hadoop); stream computing applications; a pool of replicated database servers deployed in a cloud environment; other ad-hoc query engines that might be employing other types of technologies; among others.

Figure 1B:
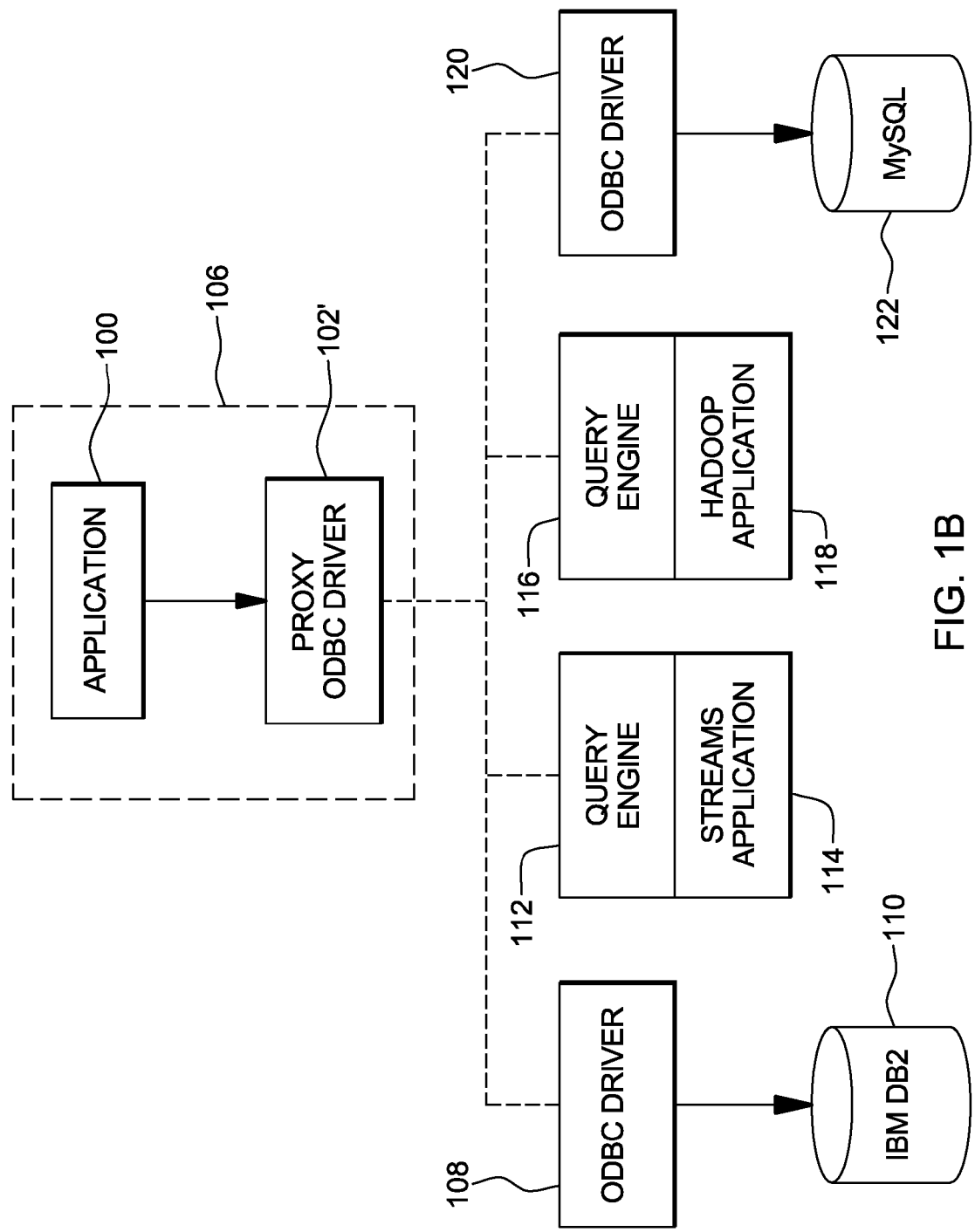
FIG. 1B depicts one embodiment of using an ODBC proxy driver, in accordance with an aspect of the present invention.

One example of a proxy driver is depicted in FIG. 1B. In this example, the proxy driver is an ODBC driver having the interfaces and functionality of typical ODBC drivers, but with the additional functionality of one or more aspects of the present invention.

Referring to FIG. 1B, in this embodiment, application 100 is now communicatively coupled to a proxy driver 102'. Application 100 and proxy driver 102' execute on a computer 106 having, for instance, a processor and memory (e.g., a UNIX® or Windows® workstation or other computing devices. UNIX® is a registered trademark of The Open Group Corporation; and Windows® is a registered trademark of Microsoft Corporation). Proxy driver 102' is coupled to a plurality of query engines. For instance, as depicted in FIG. 1B, proxy driver 102' is coupled to a DB2® database system 110 via an ODBC driver 108; a query engine 112 used for stream processing applications 114; a query engine 116 used for Hadoop applications 118; and on Oracle's MySQL database system 122 via an ODBC driver 120. Other drivers and/or engines may also be used.

The proxy driver is used to dynamically route queries received from an application based on, for instance, a variety of static and/or dynamic information. As shown in FIG. 2, application 100 issues an ODBC call 200 with one or more Structured Query Language (SQL) queries embedded therein. The ODBC call is received by proxy ODBC driver 102'. Driver 102' routes 202 the queries based on, for instance, the type of query and characteristics of one or more available query engines 204. The one or more selected engines that perform the query return results 206 to proxy driver 102', which then forwards the results 208 to application 100.

Additionally, in one embodiment, statistics 210 are provided from the query engines to the proxy driver 102' for use by the proxy driver in determining where to route future queries. Also, the proxy driver may perform configuration 212 to provide appropriate information to the query engine(s), based on administrative directives 214 provided to the proxy driver, as described further below.

Figure 3:
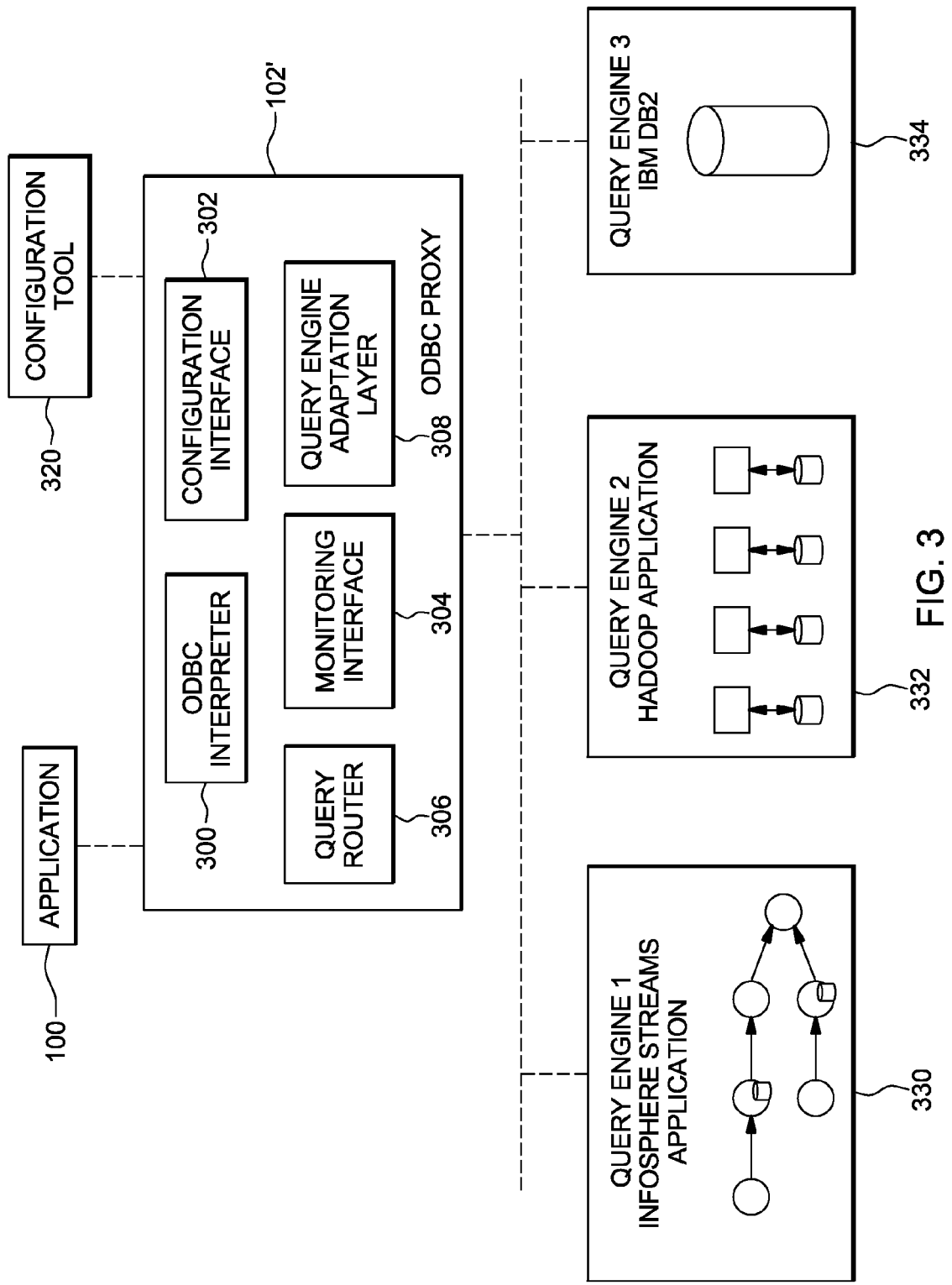
FIG. 3 depicts one example of the internal architecture of an ODBC proxy driver and examples of various query engines coupled thereto, in accordance with an aspect of the present invention.

Further details regarding a proxy driver are described with reference to FIG. 3. As shown in FIG. 3, proxy driver 102' is coupled to application 100, as well as a configuration tool 320 used to configure the proxy driver. The proxy driver receives a call from the application that includes one or more queries.

Each query is routed to one or more particular query engines (e.g., query engine 330; query engine 332 and/or query engine 334) based on a routing decision made by the proxy driver. To facilitate making this decision and performing the routing, the proxy is composed of a plurality of components, each with its own functionality and responsibility, as described below. In other examples, more, less or other components may be used.

In one implementation, ODBC proxy 102' includes the following components: (1) an ODBC Interpreter 300, (2) a Configuration Interface 302, (3) a Monitoring Interface 304, (4) a Query Router 306, and (5) a Query Engine Adaptation Layer 308, each of which is described below.

The ODBC proxy ODBC Interpreter 300 implements the ODBC interface as any other ODBC driver. The Interpreter is responsible for inspecting each query by parsing and returning the query parse tree (i.e., the query representation after having its SQL representation processed by an SQL parser (see, e.g., FIGS. 6A-6C described below)), which is then used for making a routing decision (the routing decision is made by the Query Router component, in this example) to the appropriate backend query engine by using an instance of the Query Engine Adaptation Layer. The ODBC Interpreter is also responsible for interfacing with backend query engines and relaying the query results back to the application.

The ODBC Proxy Configuration Interface 302 catalogs (a) the query types the proxy can handle (i.e., the Query Type Catalog) as well as (b) the specific query engines available for processing an application's queries (i.e., the Query Engine Catalog). The Query Type Catalog is used for declaring and managing the types of queries that can be received from an application. Each entry in this catalog includes the parsing structure of the query and the execution strategy to be used to execute instances of this query type (including the type of query engine suitable for processing this query type) when received from the application. The query execution strategy might include a translation step (carried out by the Query Engine Adaptation Layer) to convert the specific query instance into the formulation used by the query engine to be employed in computing the query results. The Query Engine Catalog is used for declaring and managing the specific query engines that an application might use to service incoming queries. Each entry in this catalog names a particular query engine, its physical location, availability, up-to-date load information (dynamically obtained), as well as information on fault-tolerant alternatives. Note that the structure and nature of the information in this catalog might vary depending on specific implementation and architectural considerations.

The ODBC Proxy Configuration Interface 302 includes a service interface to add, remove, and update entries belonging to both catalogs it manages. Such service interface enables on-the-fly modifications of these catalogs, for example, enabling the cataloguing of additional query engines and query types. This interface can be implemented as a library to be linked to command-line based tooling, as well as web-based or GUI-based tooling, enabling user-friendly interaction with the ODBC Proxy for configuration purposes, including dynamic reconfiguration for 24×7 applications.

In one embodiment, the catalogs are dynamically updated, responsive to an adding or removing of one or more query engines. The adding of a query engine includes adding the engine to the configuration, as well as moving, replicating, or partitioning the original datasets to the location where the new query engine is located. This is performed so the new query engines can have access to the data when computing the results for a particular query.

The ODBC Proxy Monitoring Interface 304 is responsible for interfacing with the specific query engines to be used by an instance of the ODBC Proxy. It provides two main services. First, it assesses whether a particular query engine is alive. This capability is implemented via a heartbeat/callback mechanism, i.e., a query engine is able to report its liveness by calling the ODBC Proxy via its monitoring interface. Alternatively, the Monitoring Interface can ping the query engine using the query engine's service interface, employing a remote procedure call mechanism, or a query engine's proprietary interface.

Second, the Proxy Monitoring Interface 304 can obtain load information, indicating the current load on of the query engine. As is the case for liveness information, load information can be communicated via a push or pull mechanism. The Monitoring Interface makes liveness and load information available to Query Router component 306, for deciding where to route specific queries when more than one option is available. Such information enables the ODBC Proxy to be informed of runtime changes (e.g., availability/unavailability and current load on query engines) and proactively act or react to changes. For example, the sudden unavailability of a particular query engine might trigger the re-routing of an incoming query to an alternative query engine.

The ODBC Proxy Query Router component 306 is responsible for implementing a query routing policy based, for instance, on the availability and current load experienced by the query engines supporting the application. On arrival of a new query, received via an ODBC call, the Query Router is invoked by the Interpreter, which provides the structured representation for the newly arrived query. The structured representation for the query provides the information used by the Query Router to identify the specific query engines that might be candidates for executing the query. The set of candidate query engines is obtained from the Configuration Interface, specifically, by matching the query type (returned by the ODBC Interpreter) with specific query engines. This operation is a logical relational join between the Configuration Interface Catalogs, the Query Type Catalog, and the Query Engine Catalog. The resulting candidate list is then evaluated against the up-to-date information describing the availability and instantaneous load on the specific query engines maintained by the Monitoring Interface.

The ODBC Proxy Query Engine Adaptation Layer 308 provides a pluggable translation mechanism for interacting with specific query engines. The pluggable architecture enables the concurrent support of different query engines. For example, it might be declared by an application architect that certain application query types should be processed by a map/reduce computational engine, such as Hadoop running on a large computational cluster, whereas another query type should be relayed to a stream processing application installed on a large SMP machine and using, for instance, IBM® InfoSphere™ Streams. (InfoSphere™ is a trademark of International Business Machines Corporation.) Remaining query types potentially issued by the application may be processed by a regular relational database. In each of these cases, the Query Engine Adaptation Layer provides a specific translation framework for interacting with these different query engines. Note that for query types that are shipped to a relational database, the Query Engine Adaptation Layer is a mere pass-through, purely relaying the query to the specific ODBC driver sitting in front of the specific relational Database Management System (DBMS) used by the application, as seen in FIG. 1B.

The translation mechanism provided by the Query Engine Adaptation Layer works bi-directionally. First, it converts incoming queries into equivalent representations that are appropriate to a specific query engine. Translating a specific query to the representation employed by the query engine includes, for instance, converting a query type representation (which in some cases is performed once), as well as binding the specific query instance parameters (which typically is done for each different query instance arriving at the Query Engine Adaptation Layer) and converting that into a query representation suitable for the specific query engine. This operation is performed on the arrival of specific queries received by the ODBC Proxy.

Second, it converts the query results computed by a particular query engine to the format typically produced by an ODBC driver. Subsequent to a query being routed to the query engine, the query engine finishes computing the query results, which are then returned to the ODBC proxy and, from it, back to the application. These query results are translated, if necessary, into a format compatible with the ODBC interface for returning a row-oriented set of results back to the application. For example, when an application submits an SQL statement via an ODBC call, the database server returns any resulting data as one or more result sets. A result set is a set of rows and columns matching the criteria of the query in tabular form. In some cases, there are multiple result sets to process. In either case, the results computed by a particular query engine (e.g., a set of files resulting from a Hadoop map/reduce job, or the contents of time-based windows from a stream processing application running on InfoSphere™ Streams) are converted into one of more ODBC result sets, such that the application can make use of these results directly as was the case with results produced by the original ODBC driver.

Figure 4:
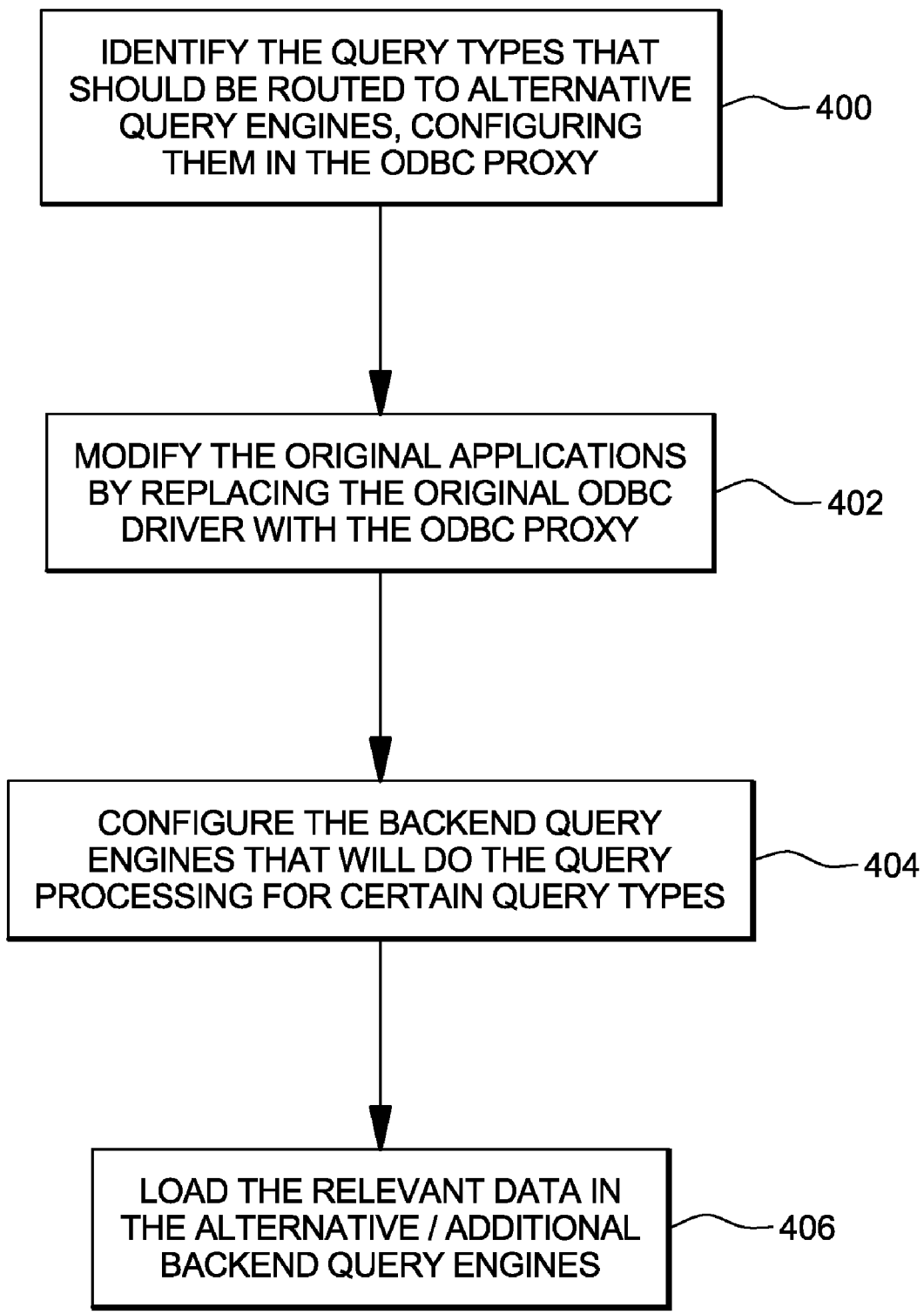
FIG. 4 depicts one example of the workflow related to using an ODBC proxy driver, in accordance with an aspect of the present invention.

Prior to using a proxy driver, in one embodiment, there are various steps to be taken by the application designers to enable use of the ODBC proxy apparatus. These steps are described below with reference to FIG. 4:

(1) Identify the query types that may be routed to alternative query engines and configure them in the ODBC proxy, STEP 400. For example, an application writer might profile the application into the production environment and identify the query types that are the bottleneck and whose speeding up will generally translate into performance improvements for the application. Those query types are then configured in the proxy by, for instance, indicating the execution strategy for each type in the Query Type Catalog;

(2) Modify the original applications by replacing the original ODBC driver with the ODBC proxy, STEP 402. This does not require modifying the source code of the application and is transparent to the developers as, in most cases, the ODBC APIs are available via a dynamically linked library. The ODBC proxy will intercept the ODBC calls, and route queries to either the original relational database server or, alternatively, to other query engines that act as a customized database server for a specific type of query;

(3) Configure the backend query engines that will do the actual query processing for certain query types, STEP 404. This includes, for instance, using the Configuration Interface and declaring query types and query engines, as well as their capabilities. Once the query processing is complete, the engines forward the results to the ODBC proxy. The ODBC proxy then relays the results to the application, similar to a regular ODBC driver.

(4) Load the relevant data to the alternative backend query engines, STEP 406. In some cases, the data is simply replicated, i.e., the same original data is available in the alternate/additional query engines. In some cases, the data is partitioned (via, e.g., an application administrator) across different query engines. In these cases, the configuration for each partition is properly described and stored in the Query Engine Catalog in the ODBC proxy and used to properly route queries depending on the availability of the data or parts of the data on different query engines. Combinations of these approaches are also possible for different segments of the original data.

Subsequent to configuring the environment for use of a proxy driver (e.g., at the OBDC Interpreter), the proxy driver may be used to facilitate query processing. This use is further described with reference to FIG. 5. The logic of FIG. 5 is performed by a proxy driver (i.e., one or more components of the proxy driver) executing on a processor (e.g., a workstation or other computing device).

Figure 5:
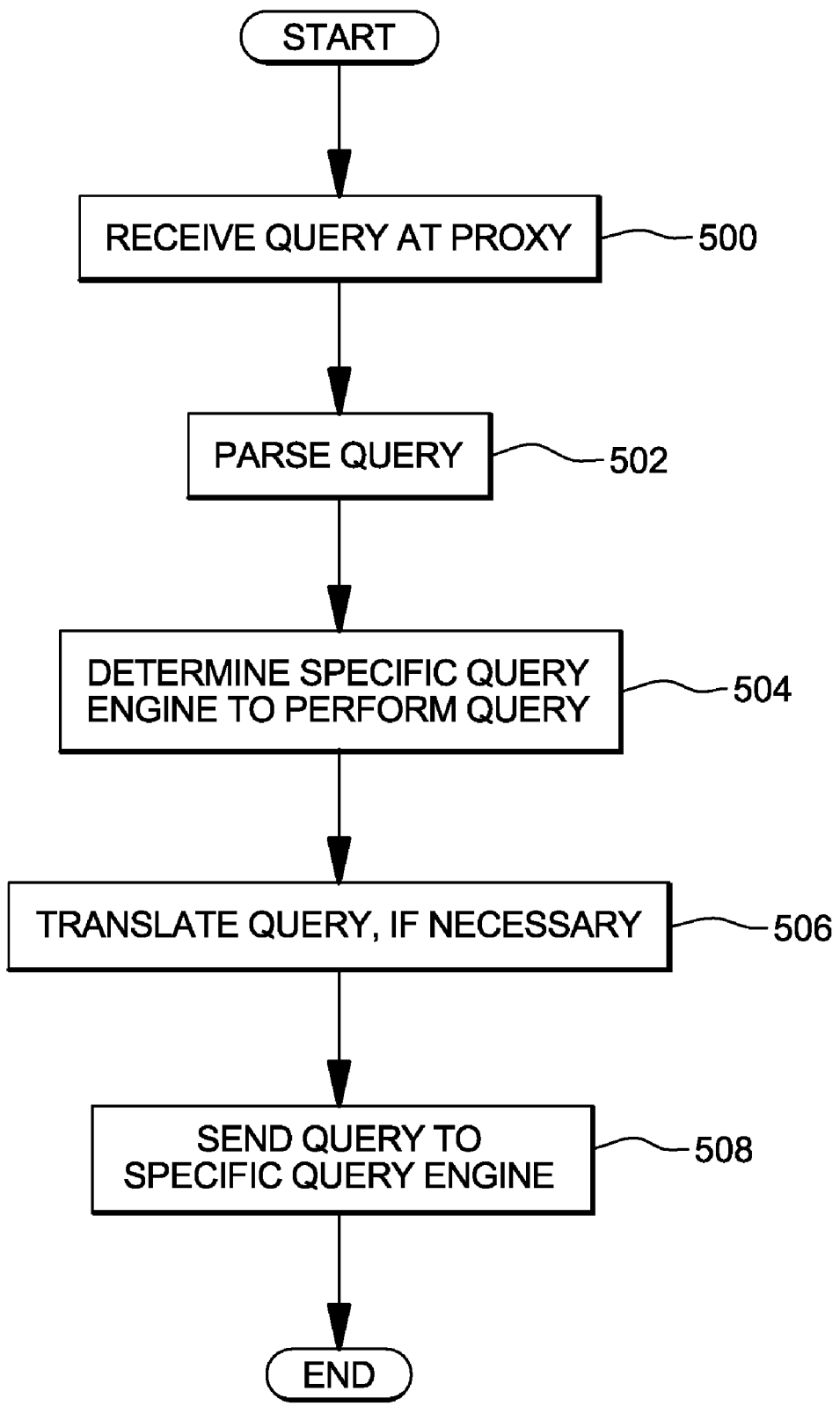
FIG. 5 depicts one embodiment of the internal processing logic implemented by an ODBC proxy driver, in accordance with an aspect of the present invention.

Referring to FIG. 5, initially, a query is received at the proxy driver (e.g., at the ODBC Interpreter), STEP 500. For example, the query is included in an ODBC call sent from an application to the ODBC proxy driver. Consistent with the architecture of ODBC, the query is encapsulated in a format resulting from, for instance, a prepare statement, such as a prepare SQL statement.

Responsive to receiving the encapsulated query, the ODBC driver (e.g., the ODBC Interpreter) parses the query to remove the extraneous information leaving just the specific query statement, STEP 502. For instance, constants are stripped off and "where" clauses are abstracted away (i.e., only the query structure is left to match against the query structure in the Query Type Catalog).

Further, the proxy driver (e.g., the Query Router) determines which specific engine or engines of the one or more query engines are to perform the query, STEP 504. In making this decision, the proxy driver considers, for instance, the type of query, as well as the characteristics of the particular query engines that are available. It then selects the one or more query engines that are best able (e.g., in terms of performance and/or capability) to perform the query. For instance, the Query Type Catalog of the Configuration Interface is searched for the type of query, and the catalog entry corresponding to that query type indicates the type of query engine to use. Then, the Query Engine Catalog is consulted to determine a list of one or more engines capable of satisfying that query type. From that list, at least one engine is selected based, for instance, on current load, current responsiveness, etc. available via the Monitoring Interface. As a specific example, if the query is of a type that should be executed by a streaming application query engine, as indicated in the Query Type Catalog, then the query is routed to one or more streaming application query engines. Many other examples are possible.

For some particular query engines, the query is to be translated to a format understandable by that query engine, STEP 506. If this is necessary, then the proxy driver (e.g., the Query Engine Adaptation Layer) translates the query to the acceptable format. For instance, for queries shipped to streaming query engines, the variable parameters are removed from the query specification and directly sent to the streaming application executing on the query engine. Further details regarding translation of relational queries into stream processing are described below.

Subsequent to determining the one or more specific query engines to perform the query and translating the query, if necessary, the query is sent to the one or more specific engines, STEP 508. The one or more specific engines then process the query and forward the results to the proxy driver, which once again transforms the results into a format understandable by the application, if necessary. It then forwards the results to the application.

In one example, multiple query engines produce partitioned results for a particular query. In such a situation, the proxy may collect the results from the multiple query engines, aggregate the results and provide an aggregated result to the application. In other embodiments, the results are not aggregated, but sent as individual results.

As described above, there are situations in which a query is translated to a form usable by the particular query engine to execute the query. The translation depends on the type of query and query engine. In one particular example, an SQL query is translated for execution by a streaming application query engine. One embodiment of this translation is described below, as well as in U.S. Ser. No. 12/868,344, entitled "Transforming Relational Queries Into Stream Processing," filed Aug. 25, 2010 (IBM Docket No. YOR920100313US1), which is hereby incorporated herein by reference in its entirety.

In this example, as an overview, a relational query (e.g., SQL) type/structure that is common to a group of relational queries is transformed into a continuous query during a prepare step. Further, during a build step, an index is built from the continuous query and relational tables of a database; and during an execute step, a series of relational queries are executed by sending parameters of each query and the index on streams of the corresponding continuous query. The continuous query may be represented as a streaming operator graph. An application that has a series of queries (e.g., SQL statements) may be analyzed before the application is launched to generate all of the needed continuous queries. Upon launching the application, the index may be built by uploading the relational tables into the streaming operator graph of the corresponding continuous query. For example, the data from the relational tables may be loaded and used to initialize the state of operators of the streaming operator graph. The data may be chosen based on the continuous query.

The continuous query may be written using a continuous query language (CQL), which is a StreamSQL dialect. One example of CQL is described in "The CQL Continuous Query Language: Semantic Foundations and Query Execution," Arvind Arasu et al., VLDB Journal, 2003. StreamSQL is a family of SQL-like languages for stream processing. The semantics of CQL are well-specified, reusing the classical relational database operators with their usual meaning In one embodiment, CQL is used as an intermediate step, because its semantics help retain the meaning of the original relational queries when they are transformed to a continuous query. This retention of query meaning is referred to as fidelity.

The above-mentioned "prepare step" transforms the relational query type/structure into a continuous query. The relational query type/structure is the part that is the same across all the individual queries in the series of relational queries. The part that is different from query to query is referred to as "the parameter". The prepare step may include representing the relational queries as a streaming operator graph by converting the parameter of the series of relational queries into a stream and converting an operator of the relational queries that uses the parameter into a relational Join operator receiving the stream.

An example of the relational query type/structure could be "SELECT attributes FROM table WHERE cond (parameter)". In this query type/structure, cond (parameter) is a condition, which is a boolean function of parameter and the parameter has a different concrete value for each relational query in the series. In other words, each relational query in the series looks as shown, differing only in the value of the parameter. For example, if the cond is "==" and the parameter is values of 0, 1, and 2, then the query type/structure would retrieve attributes from the table of a database that are equal to 0, 1, or 2.

The prepare step turns the above query type/structure into a CQL of "SELECT attributes FROM table, Now (stream-parameter) WHERE cond". The parameter is now an explicit input stream (i.e., stream-parameter) and the operator that uses the parameter is now a join (e.g., referred to as '⋈') instead of a select (e.g., referred to as 'σ'), with two inputs instead of one.

Figure 6A:
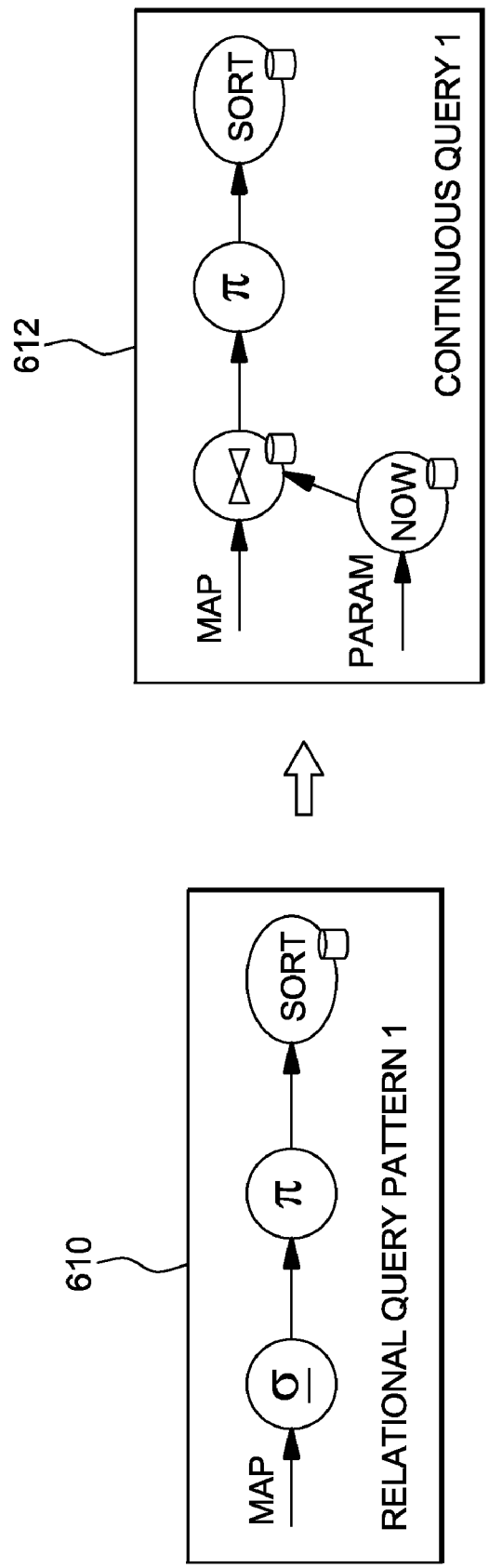
Figure 6C:
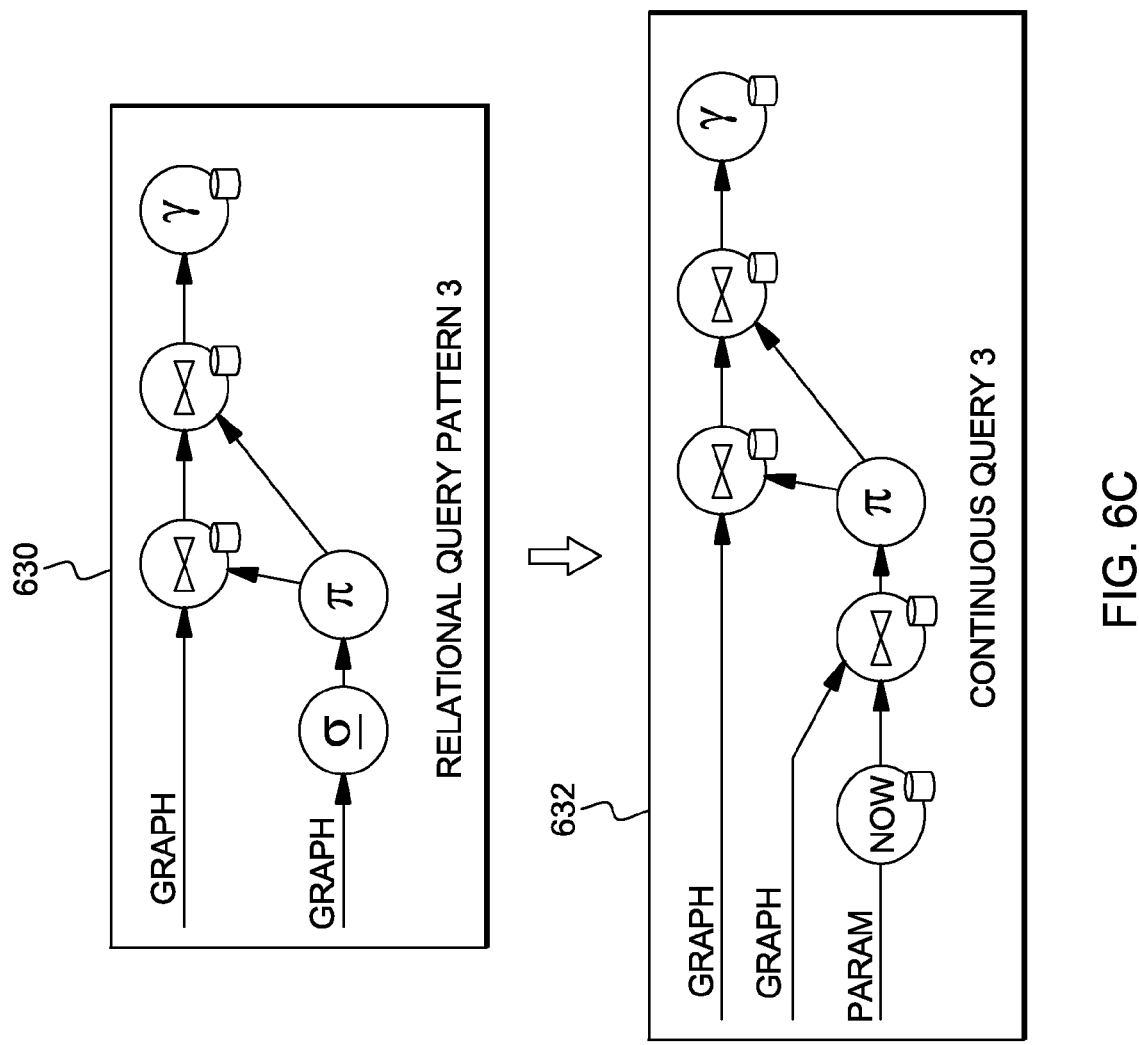

FIGS. 6A, 6B, and 6C, respectively, show three examples of results of the "prepare step". Referring to FIGS. 6A, 6B, and 6C, relational query types/structures are represented respectively as operator graphs 610, 620, and 630 and are converted respectively into continuous queries (CQLs) represented as streaming operator graphs 612, 622 and 632, respectively. In each example, the parameterized operator is underlined on the left, and replaced by a join operator '⋈' on the right. For fidelity, the operator graphs of the continuous query 612, 622 and 632 use mostly the same relational operators as before, and vary only to the degree needed to make them continuous. For example in the first relational query type/structure shown in FIG. 6A, the projection operator (e.g., referred to as 'π') and a sorting parameter are unchanged and only the select operator 'σ' receiving data of the table "map" is replaced with a join operator '⋈' that receives data of the map table and the parameters of the relational queries in a stream. Further, an aggregation operator ('γ') operator is shown in FIG. 6C, which can perform a min, max, count, average, etc.

CQL uses logical timestamps, which can be thought of as increasing integers starting from 0. The inputs to each relational operator in CQL are instantaneous relations, which are the snapshot of a relation at a given timestamp. Each relational operator then processes these just like in SQL, i.e., as if the instantaneous relations were database tables. An operator with more than one input is referred to as a confluence operator (e.g., a join operator '⋈'). Confluence operators in CQL match up the instantaneous relations from all their inputs at the identical timestamp, and then produce the output relation at that timestamp.

To implement the build index step, in one example, the relational tables are ingested (e.g., see STEP 4 above), an appropriate data representation is determined for use by the continuous query, and that representation is stored in an operator local state of the continuous query. The technique bulk-loads relations (data from the relations/tables) from the database and stores them in an appropriate representation as the initial state of the operators of the continuous query. The same operators and the same streaming application can be used for both normal execution and for index building. To do this, one can tag the relations with a timestamp (e.g., 0) and send them along the appropriate streams in the operator graph. For example, in the continuous query operator graph 612 of FIG. 6A, the build index step loads the map relation and sends it on the map edge. The data from the relation flows through the operator graph 612, eventually coming to rest in an operator local state area, which may be referred to as synopsis. As another example, in the continuous query operator graph 622 of FIG. 6B, at timestamp 0, webpage relation is first filtered by a select operator, then joined with the rootsite relation, and finally comes to rest in the synopsis of the final join operator, which will later combine it with the parameters during normal execution.

In one example, to implement the execute step, the technique includes separating a series of relational queries into relational query types/structures and their corresponding parameters. Next, the separated out query types/structures are matched with existing query types/structures from the Query Type Catalog, and the corresponding parameters of the separated out query types/structures are output as parameter streams, and routed to the appropriate one of the continuous queries for execution to produce results from the Query Engine Catalog.

Thus, as described herein, a series of relational queries is received and each query has a first part and a second part. The first part is a type/structure common to all the queries in the series, and the second part has one or more parameters that are not common to the queries in the series. The first parts are transformed into a continuous query that is embodied as a streaming application, and the parameters in the second parts are sent to the streaming application as parameter-data stream. The continuous query is executed based on the received parameter-data stream to generate query results for the series of relational queries. These results are then provided from the streaming application query driver to the proxy driver, which then translates the results into a set of results understandable by the application.

The use of a proxy driver and/or one or more aspects of the present invention is beneficial in many circumstances. For instance, in the case of a business facing growth in their query load (temporary or not), the business faces the challenge of improving an application's query answering capabilities, which, with existing technologies, typically requires acquiring additional hardware and "larger" versions of their databases. These solutions may represent substantial costs as well as disruptions in services. With use of one or more aspects of the present invention this is avoided by transparently tapping additional replicated query engines or by partitioning the work and using specialized query engines, for example.

In another typical situation, related to capacity planning, businesses typically have to plan for worse case scenarios in terms of the workload imposed on the database servers supporting the business' applications, even if load spikes are transient and seasonal, which also implies larger costs. Again, load spikes may be addressed by one or more aspects of the present invention by leveraging additional query engines temporarily.

Furthermore, certain types of queries performed by business applications (e.g., read-only, large-scale aggregations performed in the context of business intelligence and data analysis applications) are more suitable to non-conventional query engines (e.g., read-only databases, map/reduce jobs, or stream processing middleware). Many of these workloads, as well as the emerging technologies being devised to handle these types of queries, do not necessarily fit in with existing applications that makes use of ODBC interfaces. Thus, they may benefit from one or more aspects of the present invention.

One or more aspects of the present invention can be used to improve applications across three dimensions: (1) to provide improved scalability, (2) to provide improved elasticity during seasonal/transient load spikes, and (3) to provide improved fault tolerance. Other benefits might also be obtained.

A need for improved scalability originates from business growth, which usually causes both data volumes and data rates to increase. Many legacy applications store data in a single database or in a parallel database. Such an architecture is monolithic in the sense that it is usually difficult to add additional computational capability to the query-answering infrastructure without major disruptions. Therefore, evolving the computing infrastructure so these applications can make use of additional database servers or more specialized query engines can be very disruptive. However, the proxying mechanism described by one or more aspects of the present invention provides the infrastructure for addressing this challenge in a transparent way, i.e., without disrupting the original application as far as having to undertake a re-coding effort.

A need for improved tolerance to seasonal/transient load spikes is a result of many applications being deployed in a mode where they are continuously available to internal customers, as well as external customers, over the Internet, for example. In such settings, applications, such as e-business front-ends might face increased workloads, seasonally. Typical examples include increased workloads resulting from marketing campaigns or from increased traffic due to seasonal shopping sales (e.g., Black Friday, Mother's Day, etc.).

In one example, the proxying mechanism of one or more aspect of the present invention can be used for tapping on-demand resources available internally, as part of a company's IT infrastructure, or externally, as part of a public cloud infrastructure. In this case, the query routing decision process embedded in the ODBC proxy might involve monitoring the load on existing query engines, as well as monitoring the available list of equivalent query engines. With this information, the ODBC proxy can better distribute the query workload, dynamically. Again, an advantage of such an approach is in addressing the increased transient load transparently, i.e., without having to modify the original application. Note that a fundamental mechanism in these cases is the ability to route ODBC calls to additional query engines booted up on demand for processing the increased workloads.

A need for improved fault tolerance stems from applications, typically available over the Internet, which function in a 24×7 setting, with stringent quality of service guarantees. Many of these applications rely on database services as a fundamental part of their overall architecture. As a result, database availability is critical in these situations. The proxying mechanisms described by one or more aspects of the present invention can dynamically re-route queries once failures are detected. Specifically, the query routing decision in this case might involve monitoring the health of existing query engines and routing or re-routing the query workload to query engines that are functional, thereby bypassing dead or overloaded query engines or resubmitting a query which had been originally sent to a query engine currently experiencing a disruption or one that is afflicted by a problem that renders it permanently unusable.

One or more aspects of the present invention provide a mechanism for addressing the specific computational needs of certain types of queries that might be more efficiently satisfied by leveraging specialized query engines. Without limiting the scope of the applicability of the proxying mechanism, three emerging technologies, which can directly benefit from proxying ODBC calls include: (1) Map/reduce computational engines, such as Hadoop; (2) In-memory databases, such as IBM®'s SolidDB; and (3) stream computing middleware, such as IBM® InfoSphere™ Streams.

These query engines have certain specific strengths when it comes to processing compute- or I/O-intensive workloads. The map/reduce computational framework is particularly useful for read-only queries that process large collections of mostly read-only data, in which the query computation follows a model where the data is first processed independently by several service tasks and then reduced as a means to compute the final query result via a final aggregation step.

In-memory databases perform most of their computation in core, sometimes with redundant servers to ensure high-availability and performance. Therefore, these query engines bypass costly I/O operations, which results in substantially faster query response times.

Finally, stream processing environments provide the capability of processing data as it is being produced by external data sources. Interestingly, stream processing applications have been implemented using relational databases as opposed to making use of stream processing middleware. In these cases, data is first uploaded to relational tables and later processed by queries that interrogate the tables storing the data on a continuous basis, usually incurring substantial costs in performing the data processing given that it is not practical to bypass certain guarantees provided by database servers, even when those guarantees are not needed.

These emerging query engines can be used to replace certain querying needs from legacy applications, allowing these applications to employ these new technologies transparently and thus enjoying the increase in performance afforded by them.

It should be noted that not all queries executed by an application via an ODBC call must be processed by these more modern query engines. Indeed, the architecture described herein accounts for selectively shipping certain kinds of queries to specific query engines, based, for example, on the characteristics of the query (i.e., the query type), which are expected to match the computational strengths of a particular query engine.

As described herein, the technique of one or more aspects of the present invention includes the capability of performing dynamic query routing. Specifically, upon inspection of a particular query arriving at the ODBC proxy, a decision is made as to where that query will be executed, i.e., the specific query engine or engines that will be used for computing the query results. Such routing decision takes into consideration, for instance, the query type (i.e., the query is parsed and its structure is extracted. Informally, this eliminates expressions and constants, but preserves the query makeup, i.e., the kind of operation to be performed—e.g., a multi-table join, an aggregation-type group-by operation, etc.—and the tables that are to be accessed), as well as the availability and the specific capabilities of query engines that are part of a particular application ecosystem.

One or more aspects of the present invention provide the ability to transparently address performance, scalability, and fault tolerance problems facing applications in the context of their interactions with a database server with minimal disruption to the original application, as described above. Further, an on-the-fly expansion of the pool of query engines to accommodate an increased workload is provided. One or more aspects of the present invention can optionally provide elasticity to dynamically grow or reduce the amount of resources devoted to query answering (by adding/subtracting additional query engines, in situations where the query types and datasets can be partitioned or replicated).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
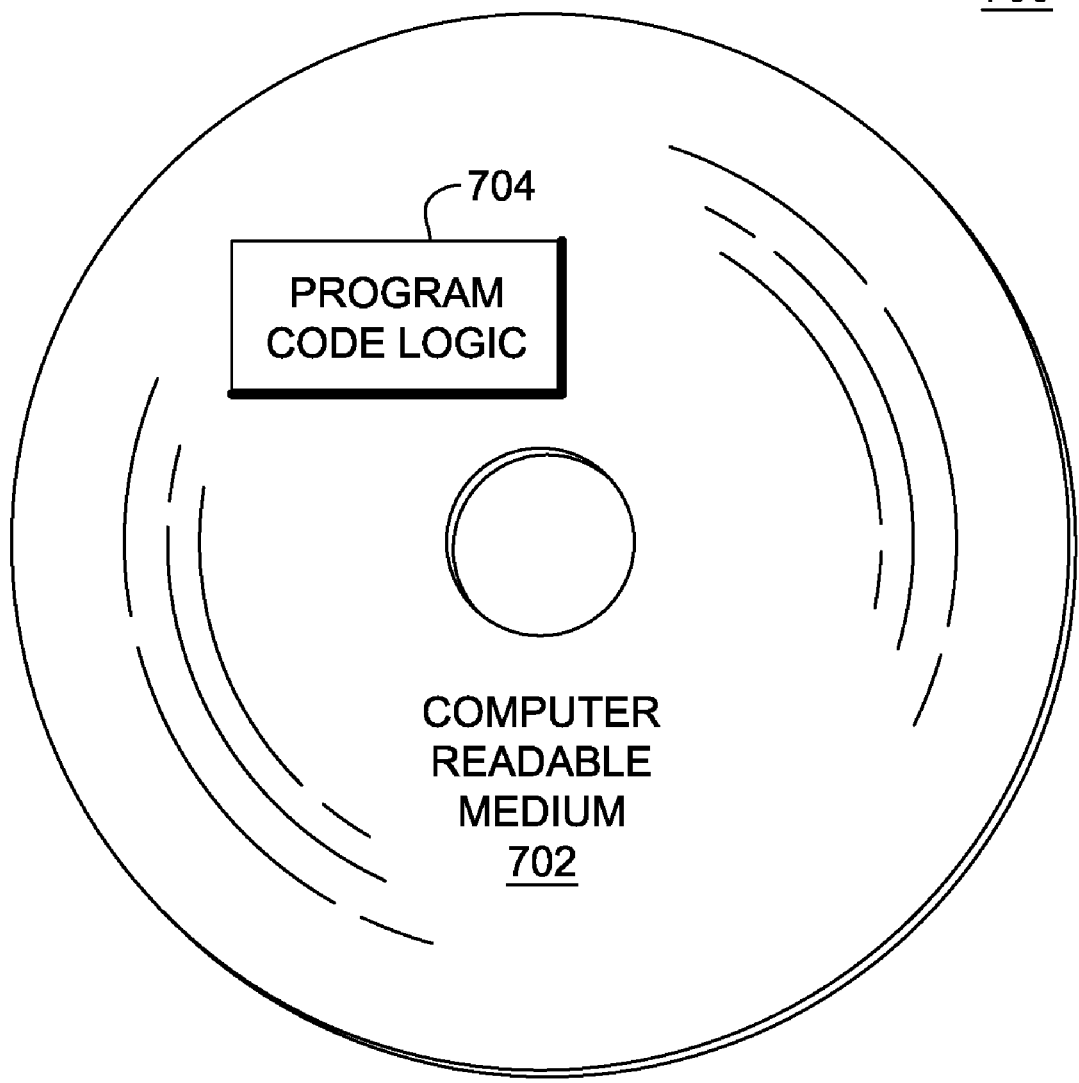
FIG. 7 depicts one embodiment of a computer program product incorporating one or more aspects of the present invention.

Referring now to FIG. 7, in one example, a computer program product 700 includes, for instance, one or more computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures and/or configurations can incorporate and use one or more aspects of the present invention. Additionally, more, less or different query engines may be used. Moreover, a proxy other than an ODBC proxy may be employed, and/or more than one proxy may be employed. Further, the characteristics and logic of the routing decision made by the proxy may be different than described herein. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method comprising:
  proxying an Open Database Connectivity (ODBC) call from an application to one or more query engines of a plurality of query engines, the proxying comprising:
    replacing an ODBC interface of a processor with an ODBC proxy as a drop-in replacement for the ODBC interface, wherein the ODBC interface is configured to perform one or more functions including at least one of: accept the ODBC call from the application, forward a query of the ODBC call to a query engine of the plurality of query engines, and return at least one result of the forwarded query to the application in a format usable by the application, and wherein based on the replacing, the ODBC proxy performs the one or more functions of the ODBC interface;
    receiving, from the application at the ODBC proxy, the ODBC call;
    determining by the ODBC proxy which one or more query engines of the plurality of query engines should be used to satisfy the query, the determining being based on one or more characteristics of the query and on one or more capabilities of the plurality of query engines to compute query results;
    routing the query to one or more selected query engines based on the determining;
    receiving by the ODBC proxy results from the one or more selected query engines; and
    returning the results received from the one or more selected query engines to the application.

2. The method of claim 1, wherein the plurality of query engines are non-homogeneous.

3. The method of claim 1, wherein the plurality of query engines comprises at least one of one or more database servers or one or more query application engines.

4. The method of claim 1, further comprising:
  translating the query to a format enabling execution of the query by the one or more selected query engines; and
  responsive to receiving the results from the one or more selected query engines, translating the results from the one or more selected query engines by the ODBC proxy to a format usable by the application.

5. The method of claim 1, wherein the one or more selected query engines comprise multiple query engines, and wherein the returning the results further comprises:
    collecting results from the multiple query engines, providing collected results;
    aggregating the collected results, providing an aggregated result; and
    returning the aggregated result to the application.

6. The method of claim 1, further comprising dynamically changing a number of query engines included as the plurality of query engines, wherein the dynamically changing comprises adding one or more additional query engines to address an increase in workload, the adding comprising:
    using a configuration interface of the ODBC proxy to configure a new query engine; and
    performing at least one of moving, replicating, or partitioning data to provide the new query engine access to the data.

7. The method of claim 1, further comprising dynamically changing a number of query engines included as the plurality of query engines, wherein the dynamically changing comprises removing one or more query engines, the removing employing a configuration interface of the ODBC proxy.

8. The method of claim 1, wherein the determining employs at least one of a query type catalog and a query engine catalog in determining the one or more selected query engines, the query type catalog including an indication of a type of query engine to be used for the query, and the query engine catalog including a plurality of query engines usable to compute query results.

9. The method of claim 8, further comprising dynamically changing the query type catalog to add one or more other types of queries.

10. The method of claim 1, wherein the ODBC proxy includes a plurality of components, and wherein the receiving is performed by an interpreter component of the ODBC proxy, and the determining and routing are performed by a router component of the ODBC proxy based on information from a monitoring interface component of the ODBC proxy.

11. The method of claim 1, wherein the ODBC interface is configured to perform each of the accepting, the forwarding, and the returning, and wherein based on the replacing, the ODBC proxy performs the accepting, the forwarding, and the returning.

12. The method of claim 1, wherein the query of the ODBC call is directed to an initial query engine of the at least one query engine, and wherein the proxying dynamically redirects the query of the ODBC call to another query engine, different from the initial query engine, for satisfying the query.

13. A computer system comprising:
    a memory; and
    a processor, in communications with the memory, wherein the computer system is configured to perform:
        proxying an Open Database Connectivity (ODBC) call from an application to one or more query engines of a plurality of query engines, the proxying comprising:
            replacing an ODBC interface with an ODBC proxy as a drop-in replacement for the ODBC interface, wherein the ODBC interface is configured to perform one or more functions including at least one of: accept the ODBC call from the application, forward a query of the ODBC call to a query engine of the plurality of query engines, and return at least one result of the forwarded query to the application in a format usable by the application, and wherein based on the replacing, the ODBC proxy performs the one or more functions of the ODBC interface;
        receiving, from the application at the ODBC proxy the ODBC call;
        determining by the ODBC proxy which one or more query engines of the plurality of query engines should be used to satisfy the query, the determining being based on one or more characteristics of the query and on one or more capabilities of the plurality of query engines to compute query results;
        routing the query to one or more selected query engines based on the determining;
        receiving by the ODBC proxy results from the one or more selected query engines; and
        returning the results received from the one or more selected query engines to the application.

14. The computer system of claim 13, wherein the plurality of query engines are non-homogeneous.

15. The computer system of claim 13, wherein the computer system is further configured to:
    translate the query to a format enabling execution of the query by the one or more selected query engines; and
    responsive to receiving the results from the one or more selected query engines, translate the results from the one or more selected query engines by the ODBC proxy to a format usable by the application.

16. The computer system of claim 13, wherein the ODBC proxy comprises a configuration interface to at least one of:
    configure a new query engine, responsive to dynamically adding one or more new query engines to address an increase in workload; and
    remove a query engine of the plurality of query engines.

17. A computer program product comprising:
    a computer readable storage medium readable by a processing circuit and storing instructions for execution by the processing circuit for performing a method comprising:
        proxying an Open Database Connectivity (ODBC) call from an application to one or more query engines of a plurality of query engines, the proxying comprising:
            replacing an ODBC interface of a processor with an ODBC proxy as a drop-in replacement for the ODBC interface, wherein the ODBC interface is configured to perform one or more functions including at least one of: accept the ODBC call from the application, forward a query of the ODBC call to a query engine of the plurality of query engines, and return at least one result of the forwarded query to the application in a format usable by the application, and wherein based on the replacing, the ODBC proxy performs the one or more functions of the ODBC interface;
        receiving, from the application at the ODBC proxy, the ODBC call;
        determining by the ODBC proxy which one or more query engines of the plurality of query engines should be used to satisfy the query, the determining being based on one or more characteristics of the query and on one or more capabilities of the plurality of query engines to compute query results;
        routing the query to one or more selected query engines based on the determining;
        receiving by the ODBC proxy results from the one or more selected query engines; and
        returning the results received from the one or more selected query engines to the application.

18. The computer program product of claim 17, wherein the plurality of query engines are non-homogeneous.

19. The computer program product of claim 17, wherein the method further comprises:

translating the query to a format enabling execution of the query by the one or more selected query engines; and responsive to receiving the results from the one or more selected query engines, translating the results from the one or more selected query engines by the ODBC proxy to a format usable by the application.

20. The computer program product of claim 17, wherein the method further comprises dynamically changing a number of query engines included as the plurality of query engines, wherein the dynamically changing comprises adding one or more additional query engines to address an increase in workload, the adding comprising:

using a configuration interface of the ODBC proxy to configure a new query engine; and performing at least one of moving, replicating, or partitioning data to provide the new query engine access to the data.

21. The computer program product of claim 17, wherein the method further comprises dynamically changing a number of query engines included as the plurality of query engines, wherein the dynamically changing comprises removing one or more query engines, the removing employing a configuration interface of the ODBC proxy.

* * * * *